United States Patent
Stambaugh et al.

(10) Patent No.: US 8,811,561 B2
(45) Date of Patent: Aug. 19, 2014

(54) CONTROL ROD DRIVE MECHANISM FOR NUCLEAR REACTOR

(75) Inventors: Kevin J. Stambaugh, Willowick, OH (US); Paul K. DeSantis, Bentleyville, OH (US); Allan R. Mackovjak, Willoughby, OH (US); John P. McLaughlin, North Royalton, OH (US)

(73) Assignee: Babcock & Wilcox Nuclear Operations Group, Inc., Euclid, OH (US)

( * ) Notice: Subject to any disclaimer, the term of this patent is extended or adjusted under 35 U.S.C. 154(b) by 761 days.

(21) Appl. No.: 12/722,662

(22) Filed: Mar. 12, 2010

(65) Prior Publication Data

US 2010/0316177 A1    Dec. 16, 2010

Related U.S. Application Data

(60) Provisional application No. 61/185,887, filed on Jun. 10, 2009.

(51) Int. Cl.
| | |
|---|---|
| *G21C 7/06* | (2006.01) |
| *G21C 9/02* | (2006.01) |
| *G21C 7/117* | (2006.01) |
| *G21C 7/14* | (2006.01) |

(52) U.S. Cl.
CPC *G21C 7/117* (2013.01); *G21C 9/02* (2013.01); *Y02E 30/39* (2013.01); *G21C 7/14* (2013.01)
USPC .......................................... 376/228; 376/224

(58) Field of Classification Search
USPC .......................... 376/228, 231, 233, 224, 261
See application file for complete search history.

(56) References Cited

U.S. PATENT DOCUMENTS

| | | | | | |
|---|---|---|---|---|---|
| 3,607,629 | A | * | 9/1971 | Frisch et al. ................... | 376/239 |
| 3,734,825 | A | * | 5/1973 | Schabert et al. ............... | 376/224 |
| 3,853,699 | A | * | 12/1974 | Frisch et al. ................... | 376/228 |
| 3,857,599 | A | * | 12/1974 | Jones et al. ..................... | 294/90 |
| 3,959,072 | A | * | 5/1976 | Dupen ......................... | 376/237 |
| 4,124,442 | A | * | 11/1978 | Zhuchkov et al. ............. | 376/233 |
| 4,187,145 | A | * | 2/1980 | Noyes et al. .................. | 376/233 |
| 4,472,348 | A | * | 9/1984 | Desfontaines ................. | 376/228 |
| 4,484,093 | A | * | 11/1984 | Smith ............................. | 310/14 |
| 4,618,471 | A | * | 10/1986 | Defaucheux et al. .......... | 376/228 |
| 4,640,811 | A | * | 2/1987 | Peletan .......................... | 376/228 |
| 4,663,576 | A | * | 5/1987 | Scarola et al. ................. | 318/685 |

\* cited by examiner

*Primary Examiner* — Jack W Keith
*Assistant Examiner* — Sharon M Davis
(74) *Attorney, Agent, or Firm* — Michael J. Seymour; Eric Marich

(57) ABSTRACT

A control rod drive mechanism (CRDM) for use in a nuclear reactor, the CRDM comprising: a connecting rod connected with at least one control rod; a lead screw; a drive mechanism configured to linearly translate the lead screw; an electromagnet coil assembly; and a latching assembly that latches the connecting rod to the lead screw responsive to energizing the electromagnet coil assembly and unlatches the connecting rod from the lead screw responsive to deenergizing the electromagnet coil assembly. The latching assembly is secured with and linearly translates with the lead screw, while the electromagnet coil assembly does not move with the lead screw. The electromagnet coil assembly is at least coextensive with a linear translation stroke over which the drive mechanism is configured to linearly translate the lead screw.

21 Claims, 15 Drawing Sheets

CONTROL ROD DRIVE MECHANISM FOR NUCLEAR REACTOR

This application claims the benefit of U.S. Provisional Application No. 61/185,887 filed Jun. 10, 2009. U.S. Provisional Application No. 61/185,887 filed Jun. 10, 2009 is incorporated herein by reference in its entirety.

BACKGROUND

In a pressurized water reactor (PWR) or other type of nuclear reactor, movable control rods are used to control the nuclear reaction. The control rods include a neutron absorbing material, and are arranged to be inserted into the reactor core. In general, the further the control rods are inserted into the core, the more neutrons are absorbed and the more the nuclear reaction rate is slowed. Precise control of the amount of insertion, and accurate measurement of same, is useful in order to precisely control the reactivity. The control rods drive mechanism (CRDM) provides this control.

In an emergency, the control rods can be fully inserted in order to quickly quench the nuclear reaction. In such a "scram", it is useful to have an alternative fast mechanism for inserting the control rods. Additionally or alternatively, it is known to have dedicated control rods that are either fully inserted (thus turning the nuclear reaction "off") or fully withdrawn (thus making the reactor operational). In such systems, the "on/off" rods are sometimes referred to as "shutdown rods" while the continuously adjustable control rods are sometimes referred to as "gray rods".

Given these considerations, it is known to construct a CRDM employing a lead screw that is engaged by a separable roller-nut assembly. During normal operation, the roller-nut assembly is clamped onto the lead screw by an affirmative magnetic force acting against biasing springs. By turning the roller nut the lead screw, and hence the attached control rods, are moved in precisely controllable fashion toward or away from the reactor core. In a scram, the electrical current is cut thus cutting the magnetic force, the biasing springs open the separable roller nut, and the gray rod including the lead screw scrams. An example of such a configuration is disclosed, for example, in Domingo Ricardo Giorsetti, "Analysis of the Technological Differences Between Stationary & Maritime Nuclear Power Plants", M.S.N.E. Thesis, Massachusetts Institute of Technology (MIT) Department of Nuclear Engineering (1977) which is incorporated herein by reference in its entirety.

For an integral pressurized water reactor (integral PWR), it is known to mount the CRDM externally and to couple with the control rods inside the pressure vessel by suitable feedthroughs. To reduce the extent of feedthroughs, it has also been proposed to integrate the CRDM within the pressure vessel. See, for example, Ishizaka et al., "Development of a Built-In Type Control Rod Drive Mechanism (CRDM) For Advanced Marine Reactor X (MRX)", Proceedings of the International Conference on Design and Safety of Advanced Nuclear Power Reactors (ANP '92), Oct. 25-29, 1992 (Tokyo Japan) published by the Atomic Energy Society of Japan in October 1992, which is incorporated herein by reference in its entirety.

Existing CRDM designs have certain disadvantages. These disadvantages are enhanced when an internal CRDM design is chosen in which the complex electro-mechanical CDRM is internal to the high pressure and high temperature environment within the pressure vessel. Placement of the CRDM internally within the pressure vessel also imposes difficult structural challenges.

The separable roller-nut creates a complex linkage with the lead screw that can adversely impact gray rod insertion precision during normal operation. Reattachment of the roller-nut to the lead screw can be complex, and it may not be immediately apparent when contact is reestablished, thus introducing a positional offset after recovery from the scram event. Scramming the lead screw also has the potential to cause irrecoverable damage to the threading or structural integrity of the lead screw. Still further, wear over time can be a problem for the complex separable roller-nut.

Another consideration is reliability. Because rod scramming is a safety-critical feature, it must operate reliably, even in a loss of coolant accident (LOCA) or other failure mode that may include interruption of electrical power, large pressure changes, or so forth.

The control rod position detector is also typically a complex device. In some systems, an external position detector is employed, which requires feedthroughs across the pressure vessel wall. For the internal CRDM of the MRX reactor, a complex position detector was designed in which a transducer generates a torsional strain pulse that passes through a magnetoresistive waveguide, and magnetic field interactions are measured to adduce the rod position. In general, an internal position detector operating on an electrical resistance basis is prone to error due to temperature-induced changes in material resistivity.

BRIEF SUMMARY

In one aspect of the disclosure, a control rod mechanism for use in a nuclear reactor, the control rod mechanism comprises: a control rod configured for insertion in a reactor core to absorb neutrons; a connecting rod connected with the control rod; a drive mechanism including a lead screw engaged with a motor-driven nut such that rotating the nut causes linear translation of the lead screw; and a latch operatively connecting the connecting rod to move together with the lead screw, the latch opening responsive to a loss or removal of electrical power to detach the connecting rod from the lead screw.

In another aspect of the disclosure, a control rod control method comprises moving a control rod linearly using a lead screw and, responsive to a scram, detaching the control rod from the lead screw whereby the control rod scrams but the lead screw does not scram.

In another aspect of the disclosure, a nuclear reactor comprises: a reactor core; a pressure vessel including a lower vessel section containing the reactor core, an upper vessel section disposed above the reactor core and above the lower vessel section, and a mid-flange located above a reactor core and disposed between the lower vessel section and the upper vessel section; and an internal control rod drive mechanism (CRDM) supported by the mid flange.

In another aspect of the disclosure, a control rod drive mechanism (CRDM) for use in a nuclear reactor comprises: a connecting rod connected with at least one control rod; a lead screw; a drive mechanism configured to linearly translate the lead screw; an electromagnet coil assembly; and a latching assembly that latches the connecting rod to the lead screw responsive to energizing the electromagnet coil assembly and unlatches the connecting rod from the lead screw responsive to deenergizing the electromagnet coil assembly.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF PREFERRED EMBODIMENTS

Figure 1:
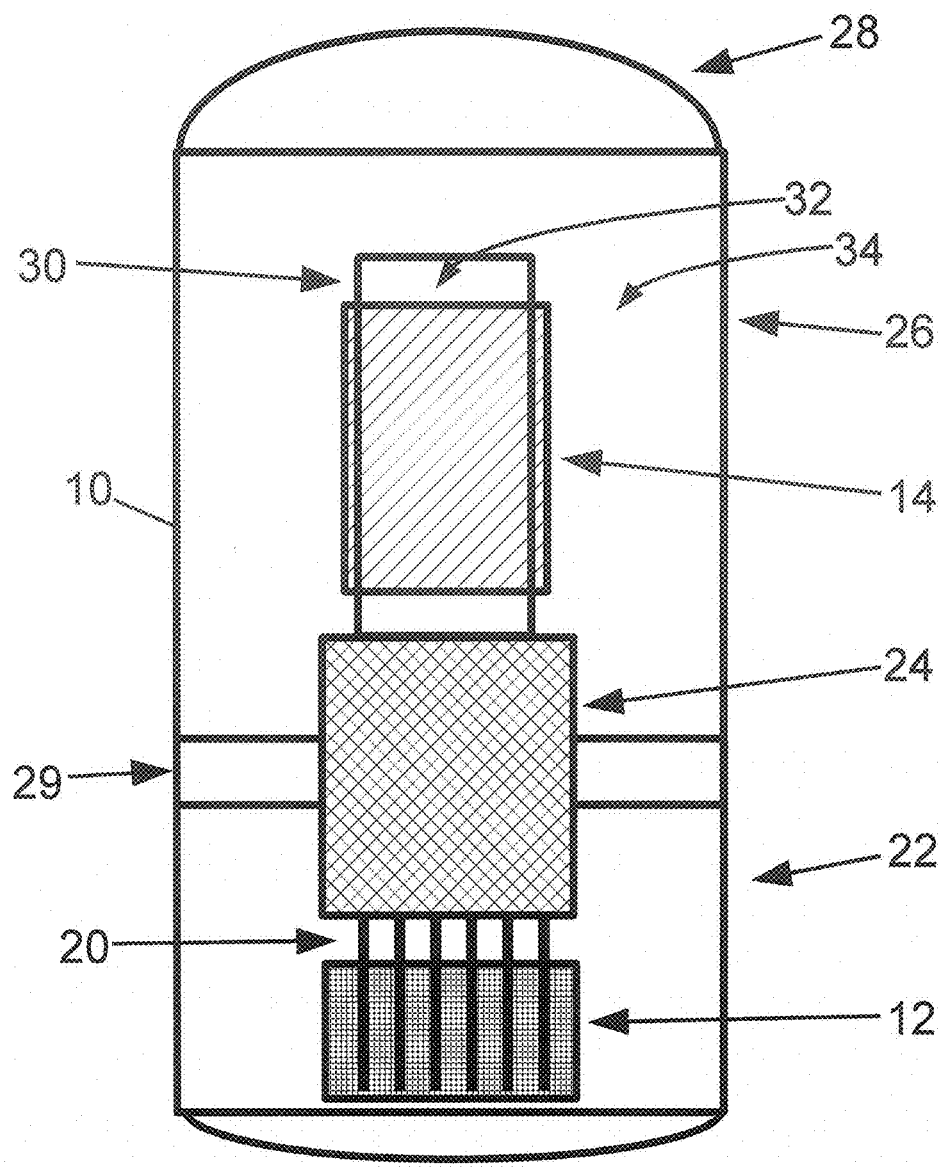
FIG. 1 diagrammatically shows an illustrative nuclear reactor vessel of the pressurized water reactor (PWR) type.

With reference to FIG. 1, an illustrative nuclear reactor vessel of the pressurized water reactor (PWR) type is diagrammatically depicted. An illustrated primary vessel 10 contains a reactor core 12, internal helical steam generators 14, and internal control rods 20. The illustrative reactor vessel includes four major components, namely: 1) a lower vessel 22, 2) upper internals 24, 3) an upper vessel 26 and 4) an upper vessel head 28. A mid-flange 29 is disposed between the lower and upper vessel sections 22, 26. Other vessel configurations are also contemplated. Note that FIG. 1 is diagrammatic and does not include details such as pressure vessel penetrations for flow of secondary coolant into and out of the steam generators, electrical penetrations for electrical components, and so forth.

The lower vessel 22 of the illustrative reactor vessel 10 of FIG. 1 contains the reactor core 12, which can have substantially any suitable configuration. One suitable configuration includes a stainless steel core former structure that contains the fuel assemblies and is replaceable in order to refuel the reactor, and which is supported by the lower vessel. The illustrative upper vessel 26 houses the steam generators 14 for this illustrative PWR which has an internal steam generator design (sometimes referred to as an integral PWR design). In FIG. 1, the steam generator 14 is diagrammatically shown. A cylindrical inner shell or upper flow shroud 30 separates a central riser region 32 from an annular down-corner region 34 in which the helical steam generators 14 are located. The illustrative steam generator 14 is a helical coil design, although other designs are contemplated. Primary reactor coolant flows across the outside of tubes of the steam generator 14 and secondary coolant flows inside the tubes of the steam generator 14. In a typical circulation pattern the primary coolant is heated by the reactor core 12 and rises through the central riser region 32 to exit the top of the shroud 30 whereupon the primary coolant flows back down via the down-corner region 34 and across the steam generators 14. Such primary coolant flow may be driven by natural convection, by internal or external primary coolant pumps (not illustrated), or by a combination of pump-assisted natural convection. Although an integral PWR design is illustrated, it is also contemplated for the reactor vessel to have an external steam generator (not illustrated), in which case pressure vessel penetrations allow for transfer of primary coolant to and from the external steam generator. The illustrative upper vessel head 28 is a separate component. It is also contemplated for the vessel head to be integral with the upper vessel 26, in which case the steam generator 14 and upper shroud 30 are optionally supported by lugs on the inside of the vessel head.

The illustrative embodiment is an integral PWR in that it includes the internal steam generators 14, which in general may have various geometric configurations such as helical, vertical, slanted, or so forth. For the purpose of redundancy, it is generally advantageous to have more than one steam generator, whose pipes or tubes are typically interleaved within the downcomer region 34 to facilitate thermal uniformity; however, it is contemplated to include only a single steam generator. Although the illustrative steam generators 14 are shown disposed or wrapped proximate to the shroud 30, in general the steam generators may fill a substantial volume of the down-corner region 34, and in some embodiments the steam generators may substantially fill the annular volume between the outer surface of the shroud 30 and the inside surface of the pressure vessel 10. It is also contemplated for the internal steam generators or portions thereof to be disposed in whole or in part in the riser region 32, above the shroud 30, or elsewhere within the pressure vessel 10. On the other hand, in some embodiments the PWR may not be an integral PWR, that is, in some embodiments the illustrated internal steam generators may be omitted in favor of one or more external steam generators. Still further, the illustrative PWR is an example, and in other embodiments a boiling water reactor (BWR) or other reactor design may be employed, with either internal or external steam generators.

Figure 2:
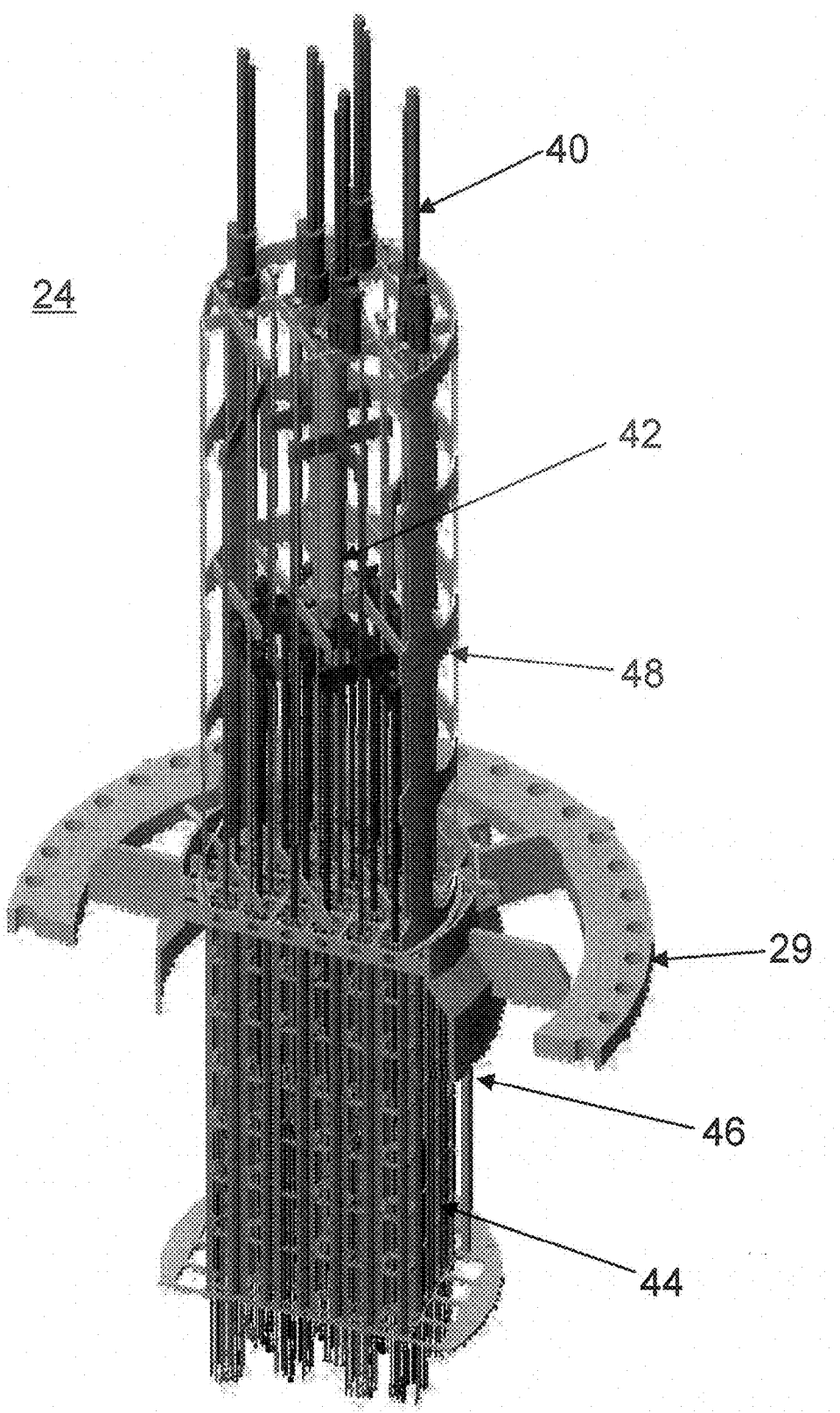
FIG. 2 diagrammatically shows the upper internals section of the illustrative nuclear reactor vessel of FIG. 1.

With reference to FIG. 2, the upper internals section 24 in greater detail. In the illustrative design the upper internals section 24 provides support for control rod drives or drive mechanisms 40, 42 and control rod guide frames 44 and is also the structure through which control rod drive power and control instrumentation signals pass. This allows the upper vessel 26 and integral steam generator 14 to be removed independently of the control rod drives and associated structure. However, a more integrated design is also contemplated, such as using a common section for both the CRDM support and the integral steam generator support.

With particular reference to the illustrative embodiment of FIG. 2, the upper internals structure 24 includes an upper internals basket 46, a CRDM support structure 48, control rod guide frames 44, and the control rod drive mechanisms 40, 42 themselves. The upper internals basket 46 is suitably a welded structure that includes the mid-flange 29 and the support structure for the control rod guide frames 44. In one suitable embodiment, the control rod guide frames 44 are separate 304L stainless steel welded structures that are bolted in place, the mid-flange 29 is a SA508 Gr 4N Cl 2 carbon steel forging, and the balance of the structure is 304L stainless steel. The CRDM support structure 48 includes support lattices for the control rod drives 40, 42 and guide structure for the in-core instruments. All of these are suitably 304L stainless steel. The CRDM support structure 48 is bolted to the upper internals basket 46. These are merely illustrative materials and construction, and other configurations and/or reactor-compatible materials are also contemplated.

The illustrative example of FIG. 2 employs two types of control rod drives 40, 42: a hydraulic control rod drive type 42 that operates the shutdown rods which are either fully withdrawn or fully inserted into the core; and an electrical control rod drive type 40 that operates the gray rods which are inserted various amounts throughout the life of the core to control the nuclear reaction rate during normal reactor operation. The gray rods are also configured to scram, that is, to be rapidly inserted into the reactor core 12, during certain emergency conditions. In other embodiments, it is contemplated to omit the shutdown rods entirely in which case the gray rods also provide shutdown operation.

Figure 3:
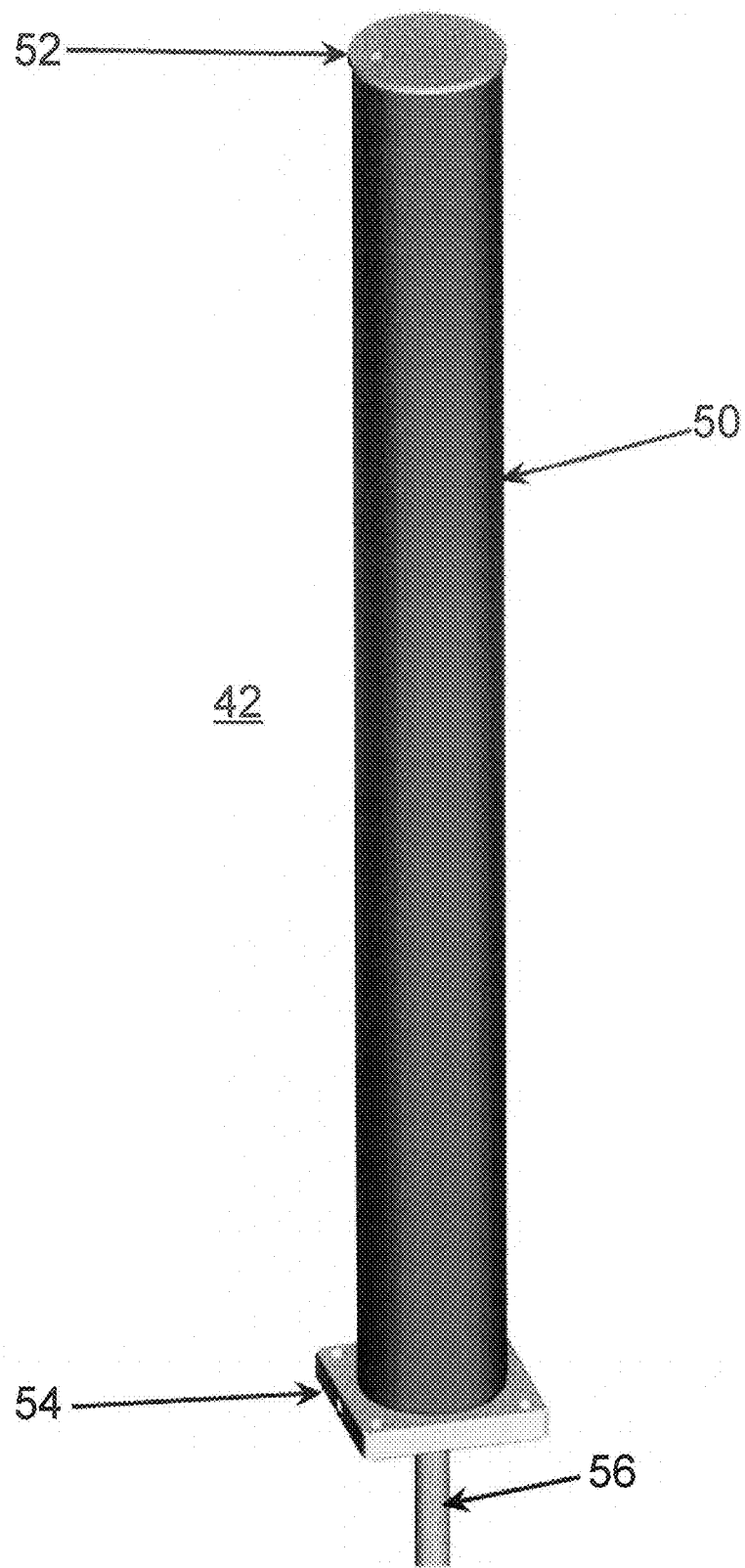
FIGS. 3-5 diagrammatically show aspects of a shutdown control rod system employing hydraulic lift.
Figure 4:
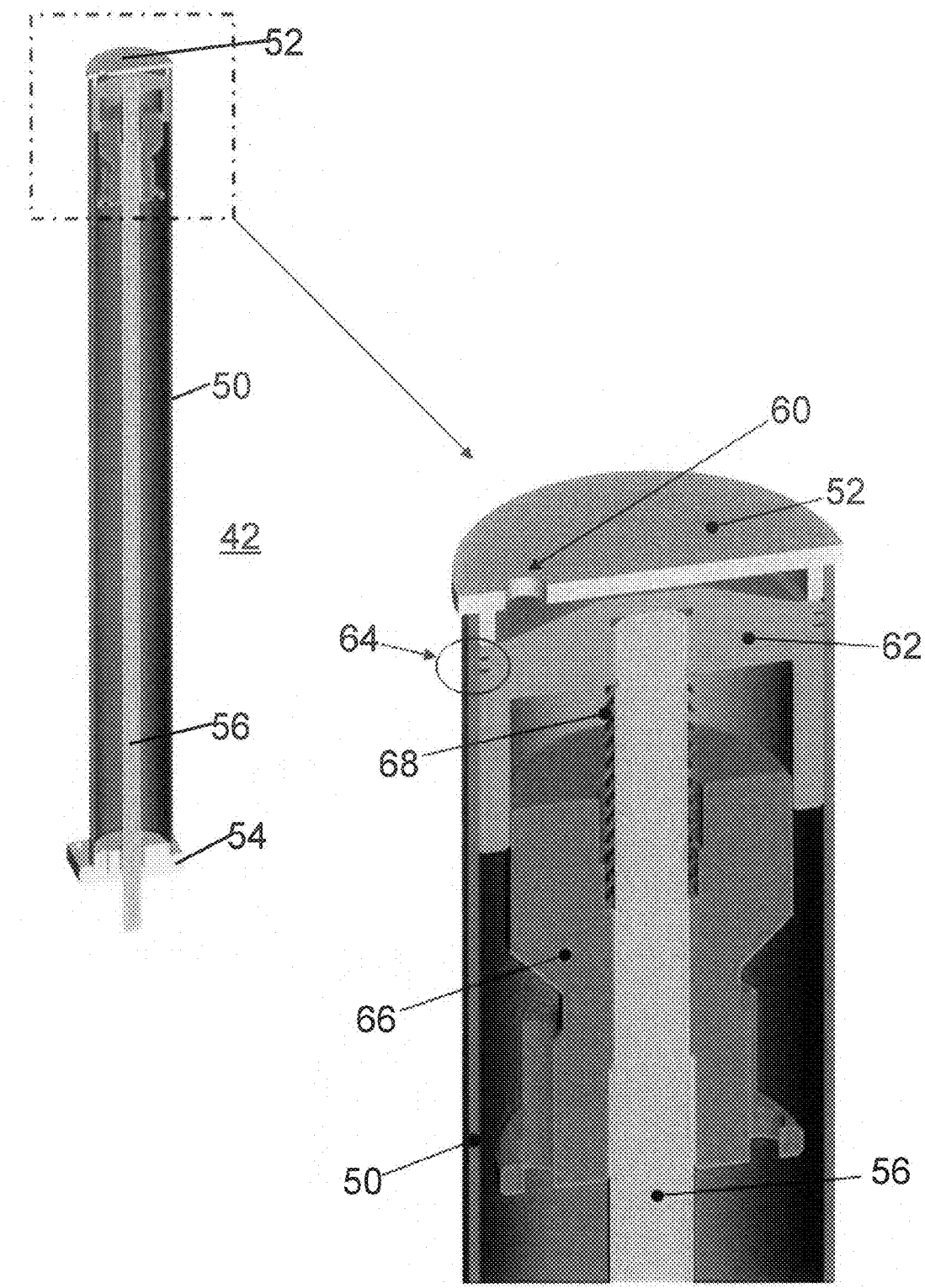
Figure 5:
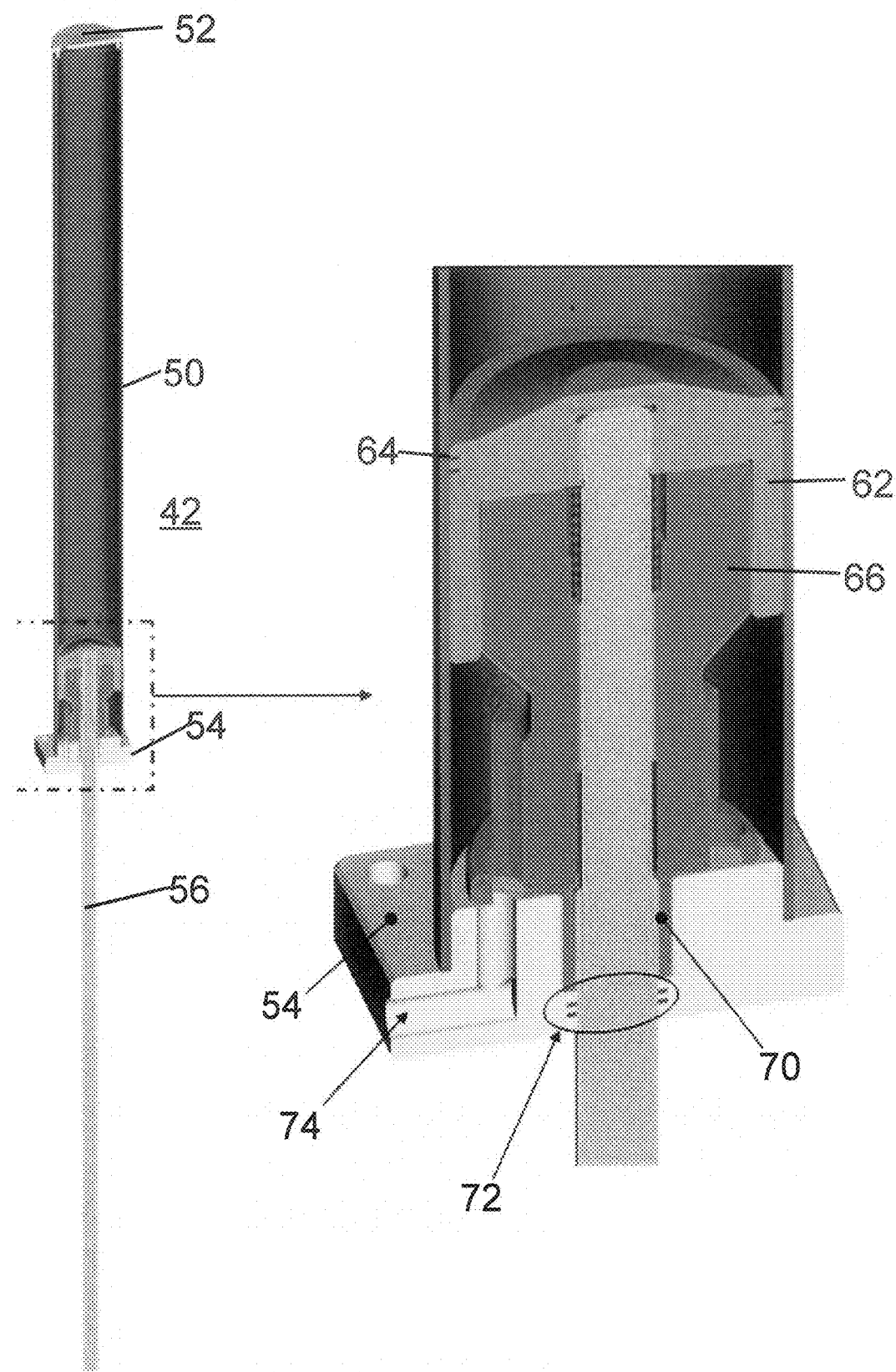

With continuing reference to FIG. 2 and with further reference to FIGS. 3-5, aspects of the shutdown rods are illustrated. The shutdown rods are suitably arranged in clusters mounted on spiders or the like that are all operated in single bank and are all moved by a single shutdown rod drive 42. FIGS. 3-5 show only the single shutdown rod drive 42, but not the spiders and individual shutdown rods. This configuration is cognizant of the fact that the shutdown rods are used in a binary "on/off" manner, and are either all wholly inserted into the reactor core 12 in order to shut down the reaction, or are all wholly withdrawn from the reactor core 12 in order to allow normal reactor operation.

With particular reference to FIG. 3, the shutdown rod drive 42 includes a cylinder housing 50, a cylinder cap 52, a cylinder base plate 54, and a connecting rod 56 providing connection to the shutdown rod lattice (not shown). The illustrative shutdown rod drive 42 of FIGS. 3-5 is a hydraulically actuated drive using reactor coolant inventory clean-up return fluid from high pressure injection pumps at approximately 500° F. (260° C.) and 1600 psi to hold the shutdown rod bank out of the reactor core 12.

With particular reference to FIG. 4, a sectional view of the piston region with the rod in the withdrawn position is shown. In an enlarged portion of FIG. 4 a vent port 60 of the cylinder cap 52 is shown, together with a lift piston 62, piston rings 64 (which in some embodiments are metallic), a scram buffer 66, and a buffer cocking spring 68. The withdrawn position shown in FIG. 4 corresponds to the shutdown control drive cylinder 42 being pressurized.

With particular reference to FIG. 5, a sectional view of the piston region with the rod in the inserted position is shown. An enlarged portion of FIG. 5 shows the lift piston 62, the piston rings 64, the scram buffer or scram buffer piston 66, a rod guide bushing 70, and rod sealing rings 72 (which in some embodiments are metallic). The cylinder base plate 54 is seen in the enlarged portion to include a pressure port or inlet port 74. The inserted position shown in FIG. 5 corresponds to the shutdown control drive cylinder 42 being unpressurized.

In some embodiments, the coolant is allowed to bleed past the piston and shaft seals 64, 72 and becomes part of the inventory returned to the reactor vessel 10. The shutdown rod drive cylinder 42 is mounted above the reactor core 12. A hydraulic line (not shown) to actuate the cylinder 42 is routed through the flange 29 and instrument lines are routed through pressure tight conduit to common connectors that are also optionally used for the gray rod drives 40. The extension rods that connect the control rod spiders to the shutdown rod lattice are optionally designed so that they will slide through the lattice so that a single stuck cluster will not prevent the other sets of control rods from dropping. Additionally, the extension rods are designed to be disengaged from the control rod spider so that the shutdown rods remain in the core when the upper internals 24 are removed. Disengagement and reengagement is done using remote tooling at during refueling operations.

During normal reactor operation, the shutdown rods are suspended completely out of the reactor core (that is, in the withdrawn position) by pressurization of the shutdown rod hydraulic cylinder 42. For example, in one suitable embodiment coolant inventory clean-up return fluid from the high pressure injection pumps is supplied at 500° F. (260° C.) and 1600 psi to the underside of the lift cylinder piston 62, via the inlet port 74 of the cylinder base 54. In this example, the fluid present in the cylinder 50 above the piston 62 is supplied from the reactor vessel 10 through the cylinder cap vent port 60, and is therefore at the reactor vessel conditions of 600° F. (315° C.) and 1500 psi, resulting in a net 100 psi pressure differential across the piston 62. Piston sizing is selected such that the developed pressure differential is sufficient to support the specified load of the shutdown rods and supporting spiders and other associated components and lift the shutdown rod bank through the cylinder stroke to the top stop of the piston 62.

In the event of a vessel-pressurized scram, the shutdown rod bank is abruptly released by ceasing the supply of pressurized coolant to the bottom side of the lift piston 62 and venting the supply line to atmospheric pressure. In the aforementioned example the vessel pressure at the top surface of the lift piston 62 is expected to create an initial 1500 psig pressure differential across the lift piston, which acts along with the influence of gravity to propel the translating assembly (including the lift piston 62, scram buffer piston 66, cocking spring 68, connecting rod 56, and shutdown rod lattice (not shown) downward toward the full insertion position illustrated in FIG. 5. During the descent of the translating assembly, the force of the buffer cocking spring 68 holds the buffer piston 66 out of the bore of the lift piston 62, preserving a fluid-filled buffer cavity between the two pistons 62, 66. When the bottom surface of the buffer piston 66 impacts the fixed base plate 54 of the cylinder assembly, the continued travel of the lift piston 62 expels the trapped fluid through controlled flow restrictions, thereby dissipating the kinetic energy of the translating assembly. Additionally, kinetic energy is dissipated through elastic deformation of the translating assembly components, especially the long, relatively slender, connecting rod 56. Other kinetic energy dissipation mechanisms are also contemplated. When the fluid is expelled from the cavity, the lift piston 62 impacts the buffer piston 66, bringing the translating assembly to rest.

Figure 6:
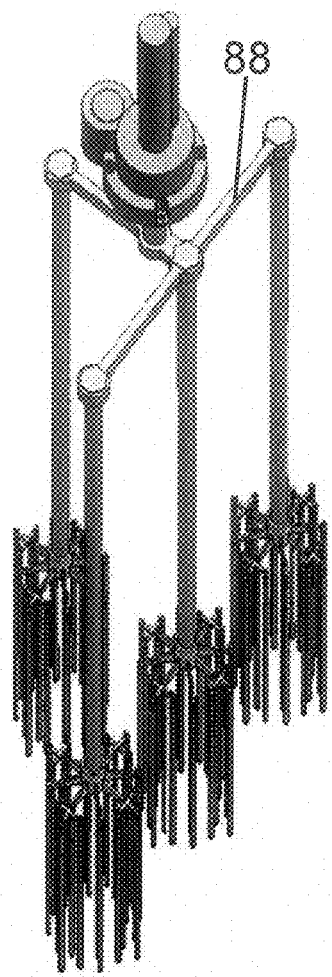
FIGS. 6-15 diagrammatically show aspects of a control rod system with electromagnetic gray rod functionality and a magnetic latch system for scram functionality.
Figure 6:
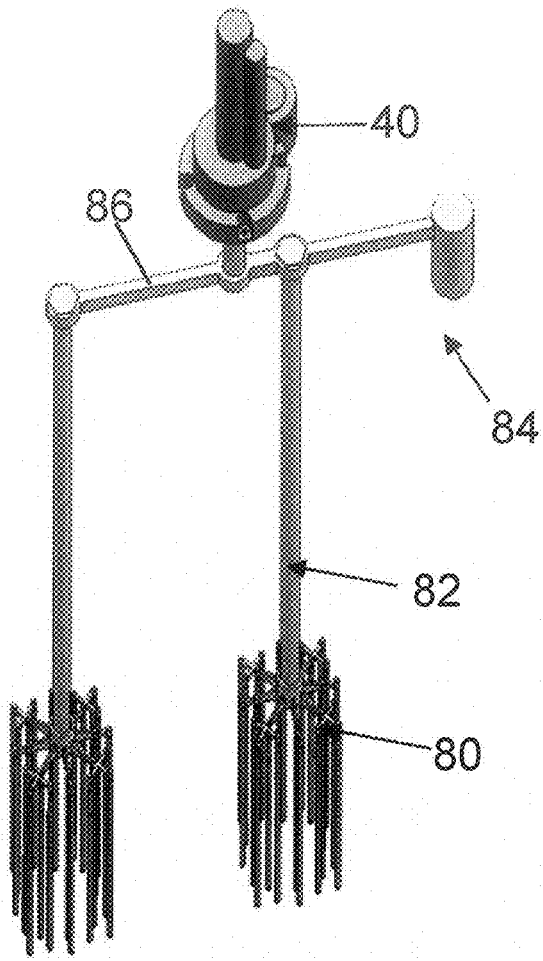
Figure 7:
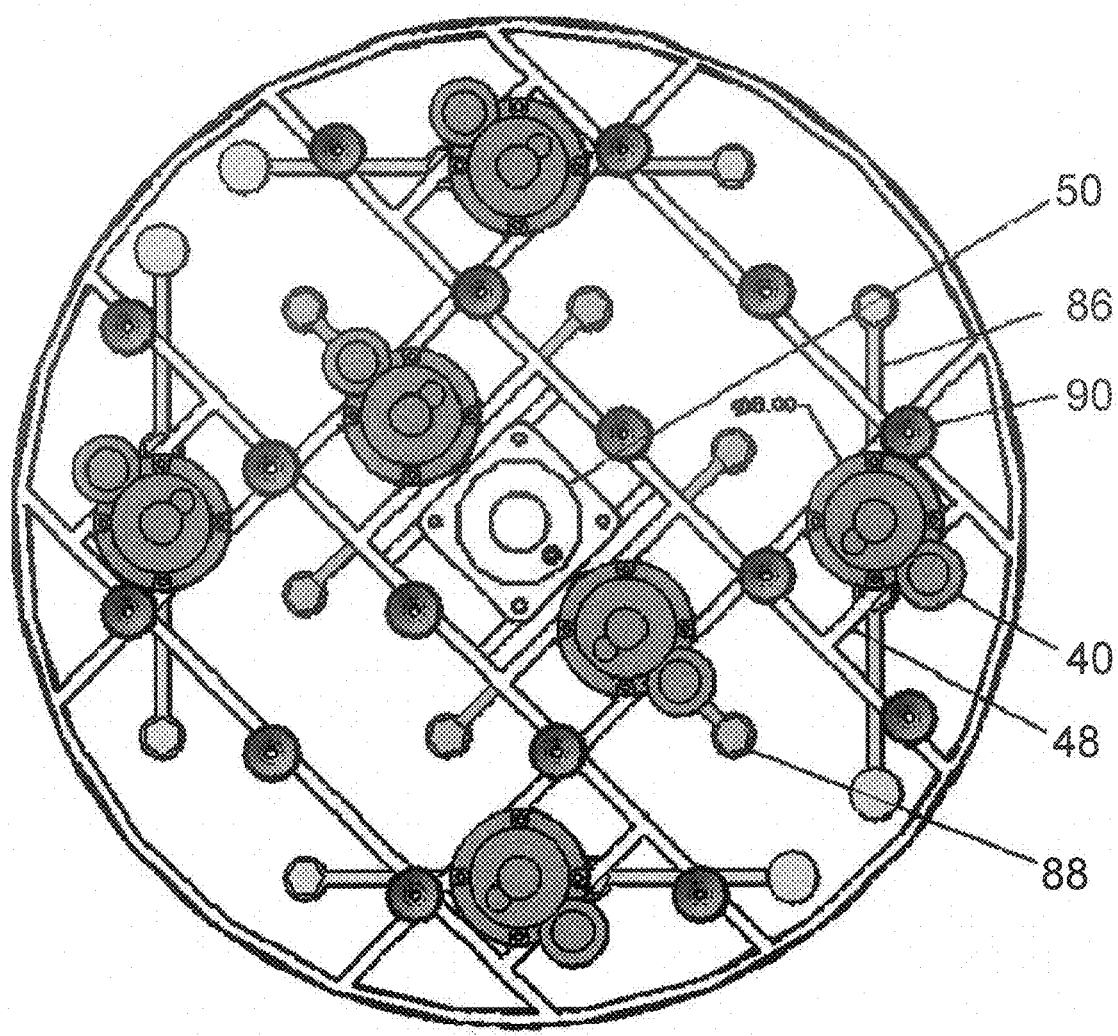

With continuing reference to FIGS. 1 and 2 and with further reference to FIGS. 6-14, an illustrative embodiment of the gray rods and associated drive mechanisms 40 is described. As seen in FIG. 6, in the illustrative embodiment there are two different gray rod configurations (Type 1 and Type 2). The gray rods 80 are arranged as gray rod clusters, which in turn are yoked together in groups of two or four and supported by connecting rods 82 as shown in FIG. 6. The configuration Type 1 also includes a counterweight 84 in place of one connecting rod/cluster unit. More particularly, a yoke 86 connects two connecting rods 82 and the counterweight 84 to form a configuration of Type 1. A yoke 88 connects three connecting rods 84 to form a configuration of Type 2. The gray rod drives 40 are mounted above the reactor core 12. FIG. 7 shows a plan view of the locations of the gray rod drives 40 and of the shutdown rods lift cylinder 50, respective to the CRDM support structure 48. The shutdown rods lift cylinder 50 is centrally located. Four outboard gray rod drives 40, each moving two rod configurations of Type 1 including yokes 86, move simultaneously. Two inboard drives 40, each moving four rod configurations of Type 2 including yokes 88, move simultaneously. These different sets of drives 40 optionally move together or independently. Power and signal connections are suitably routed through a pressure tight conduit or in-core instrumentation guide 90 to connectors on the mid-flange 29 (not shown in FIG. 7).

Figure 8:
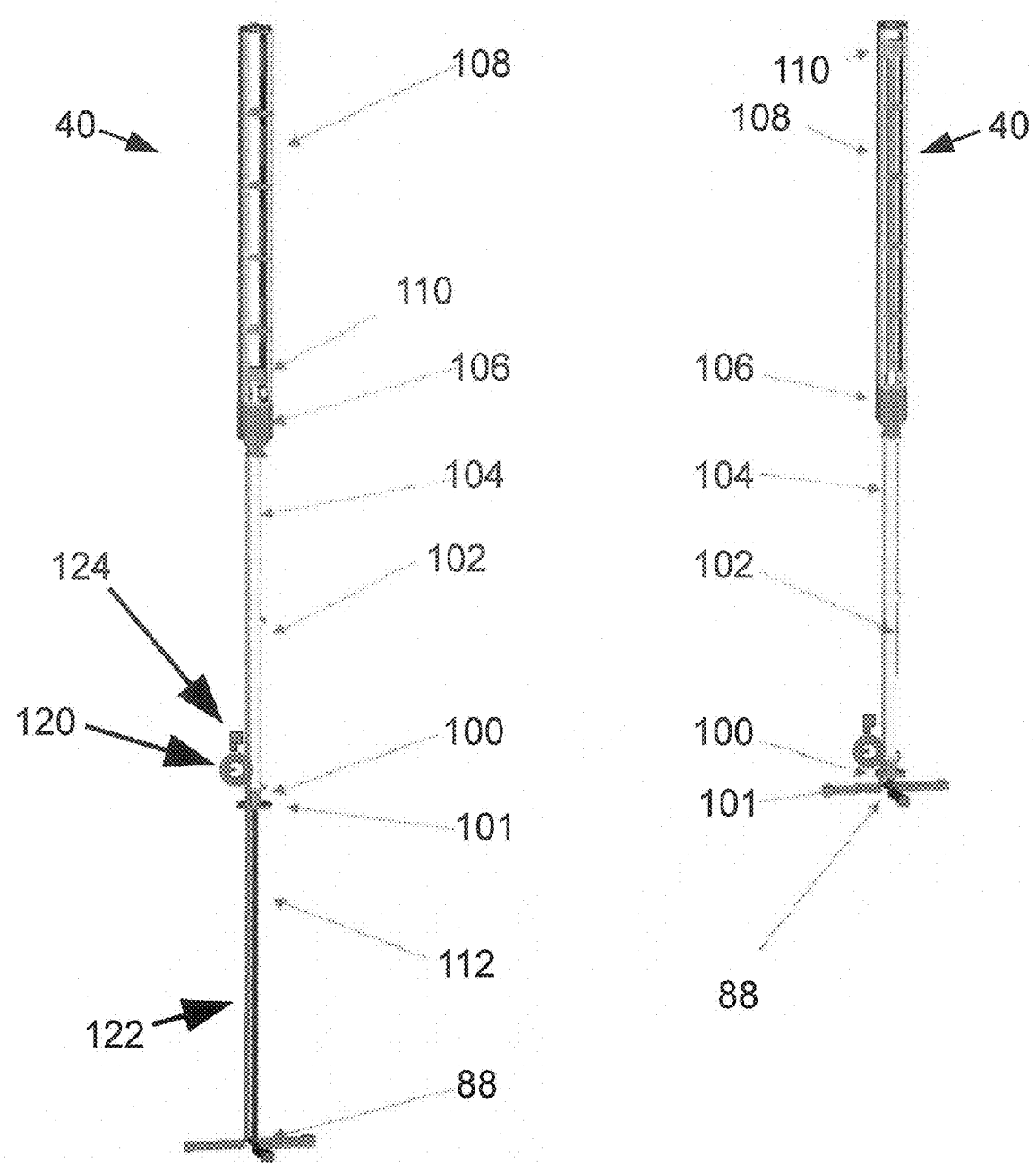

As with the shutdown rods, the extension rods that connect the control rod spiders to the rod lattice are optionally designed so that they will slide through the lattice so that a single stuck cluster will not prevent the other sets of control rods from dropping. Additionally, the extension rods are optionally designed to be disengaged from the control rod spider so that the gray rods can remain in the core when the upper internals are removed or be removed while the upper internals are on their support stand. Two suitable design styles for the gray rod control mechanism include the "magnetic jack" type and the "power screw" type. Of these, the power screw type is expected to provide more precise position control for the gray rod clusters, and With reference to FIG. 8, in one illustrated embodiment the gray rod control mechanism 40 employs a ball nut lifting rod configuration. FIG. 8 shows both the fully inserted state (left-side drawing) and fully withdrawn state (right-side drawing). The drawings of FIG. 8 show the yoke 88 of the Type 2 configuration; for the Type 1 arrangement the yoke 88 is replaced by the yoke 86. In the embodiment shown in FIG. 8, a bottom stop/buffer assembly 100 is mounted on a reactor support 101, optionally with additional lateral support provided for the electromagnet coil assembly. Lower and upper support tubes 102, 104, which mount to the top of the bottom stop 100, provide the guidance for the lead screw/torque taker assembly. A ball nut/motor assembly 106 mounts on top of the upper support tube 104 and an electromagnet coil assembly 108 mounts to the top of the motor. Within the electromagnet coil assembly 108 resides a lifting rod-to-lead screw latching assembly 110 that (when latched) supports a lifting/connection rod assembly 112 (seen extended in the inserted state, i.e. left-side drawing).

A position indicator assembly is mounted to the support tubes 102, 104 between the ball nut/motor assembly 106 and the bottom stop assembly 100. In some embodiments, the position indicator is a string potentiometer suitably mounted below the latching assembly 110, although other mounting locations are contemplated. The illustrated string potentiometer includes a tensioned spool 120 mounted on the support tube 102 and a "string" or cable or the like 122 having an end attached to the lifting/connection rod assembly 112 such that the string or cable 122 is drawn off the spool 120 against the tension as the lifting/connection rod assembly 112 (and, hence the attached gray rod clusters) move toward the reactor core 12 (not shown in FIG. 8). When the motion is reversed, the tension in the tensioned spool 120 causes the string or cable 122 to roll back onto the spool 120. A rotational sensor 124 measures the rotation of the tensioned spool 120 using an encoder that counts passage of fiducial markers or another rotational metric. The mounting of the string potentiometer can be otherwise than that illustrated, so long as the tensioned spool 120 is mounted at a location that does not move with the gray rods and the string or cable 122 is secured to move with the gray rods. It is also contemplated to integrate the rotational sensor 124 with the tensioned spool 120. The string potentiometer provides an electrical output signal consistent with the location of the connecting rod or other component 112 that moves with the gray control rod, thus providing positional information for the gray control rods within the reactor core 12. The electrical position indication signal is conveyed out of the reactor vessel 10 through an electrical feedthrough (not shown), which can be made small and/or integrated with other electrical feedthroughs. The position indicator device is configured and calibrated for operation at reactor vessel temperature and radiation level.

Figure 9:
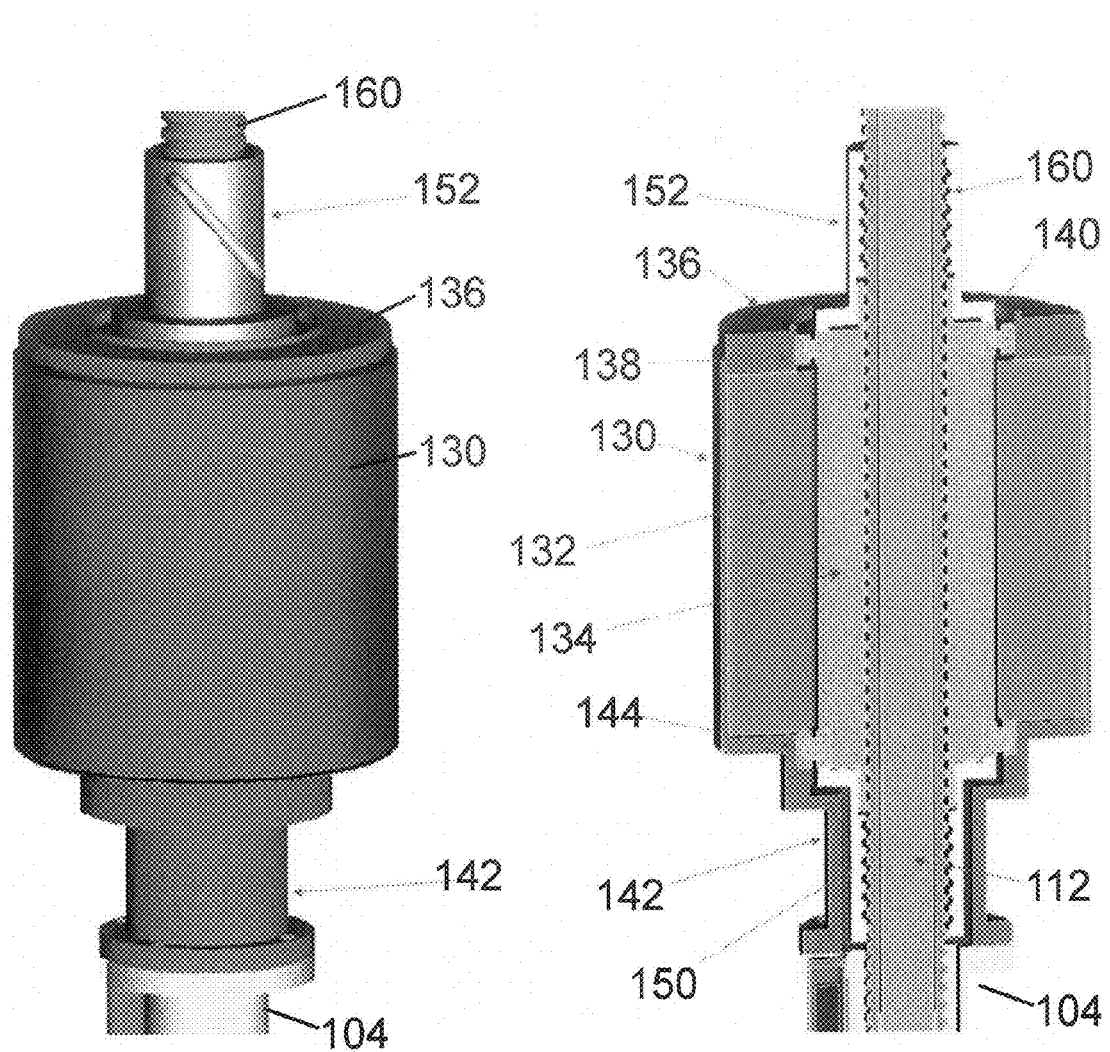

With continuing reference to FIG. 8 and with further reference to FIGS. 9-14, in the illustrated embodiment the translating assembly of the gray rod CRDM 40 includes three elements: a lead screw/torque taker assembly; a lifting rod/connecting rod assembly; and a latching system that operatively connects the lifting rod with the lead screw. FIG. 9 shows the lead screw/torque taker assembly in perspective (left side) and sectional (right side) views. A motor assembly includes a stator housing 130 housing a stator 132 and a rotor 134. An upper stator end plate 136 and a radial bearing 138 with adjustable spacer 140 complete an upper portion of the motor assembly, while a lower housing 142 and a thrust bearing 144 complete a lower portion of the motor assembly.

A lower ball-nut assembly 150 disposed within the lower housing 142 is threaded to the rotor 134, and an upper ball nut assembly 152 is also threaded to the rotor 134. Both ball-nut assemblies 150, 152 are coupled in threaded fashion with a lead screw 160 (shown in part in FIG. 9). FIG. 9 further shows portions of the lifting rod 112 and the upper support tube 104.

Figure 10:
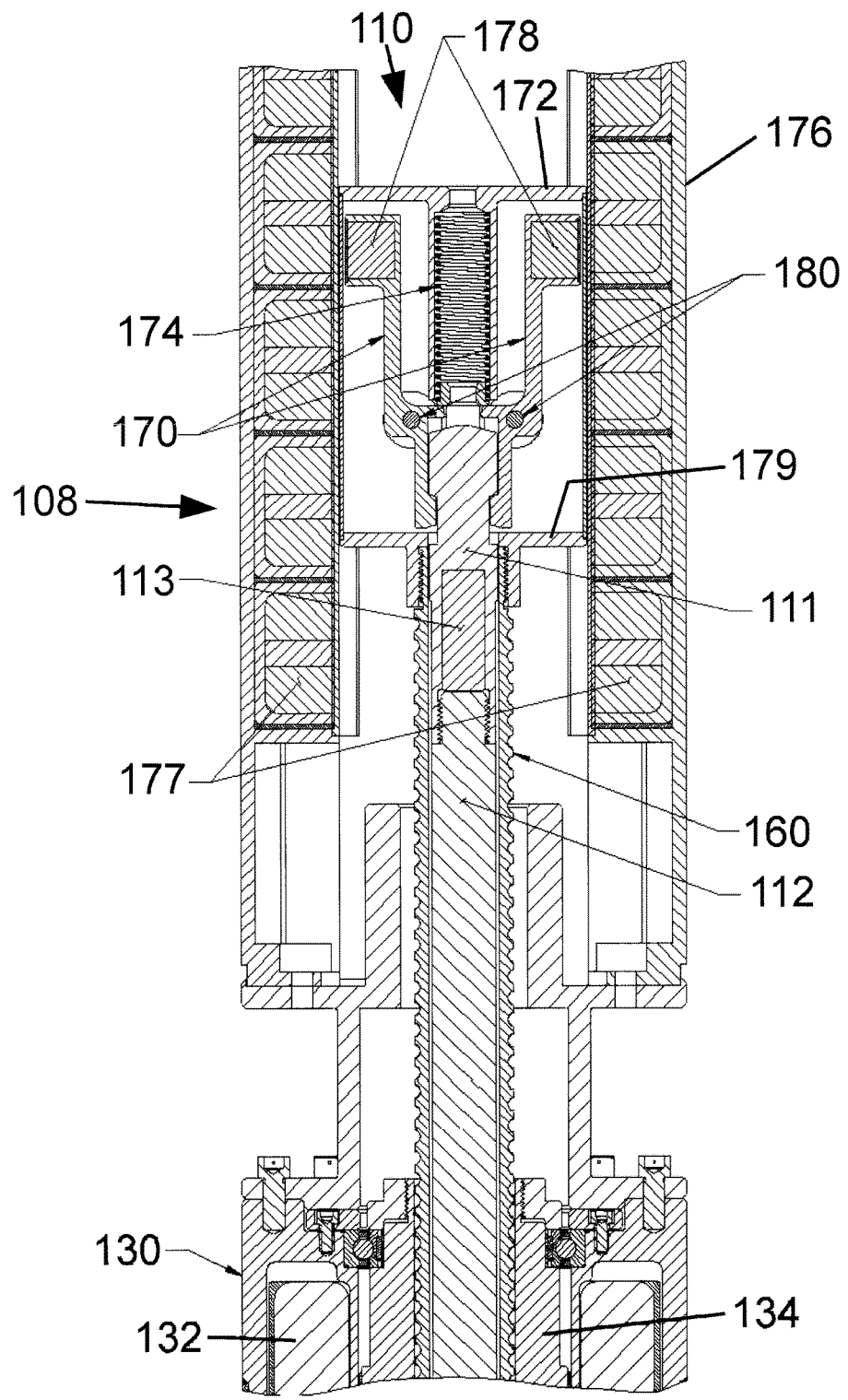

With reference to FIG. 10, the latching system is illustrated, including the lifting rod-to-lead screw latching assembly 110 and a portion of the electromagnet coil assembly 108. Also shown in FIG. 10 are an end 111 of the lifting rod 112 and a proximate end of the lead screw 160 terminating at or in the latching assembly 110. Latches 170 directly connect the top end 111 of the lifting rod 112 to the lead screw 160 for normal operation, and disconnect the lifting rod 112 during scram (see FIG. 11). The bottom of the lifting rod 112 is threaded to the top of the connecting rod 82 (optionally by the intermediary yoke 86 or intermediary yoke 88) thereby creating a continuous lifting rod/connecting rod assembly. The bottom of the connecting rod 82 couples directly to the control rod spiders thereby attaching the control rods to the mechanism. Optionally, a magnet 113 is disposed proximate to the top 111 of the lifting rod 112 to provide a magnetic signal for a magnetically-based position indicator (see FIG. 21). FIG. 10 also shows a portion of the motor including portions of the motor housing 130, stator 132, and rotor 134, which is shown in full in FIG. 9.

The latches 170 are housed in a latch housing 172 that includes a spring guide for a latch spring 174. Additional components of the illustrated latching system embodiment include an electromagnet housing 176 housing electromagnets 177 forming an electromagnet coil stack, and permanent magnets 178 on the latches 170. The lead screw 160 is threaded into a latching system base 179 of the latch housing 172. The latches 170 are arranged to pivot about pivot locations 180 to provide a failsafe scram due to downward rod load.

In this embodiment, the lead screw 160 is continuously supported by a ball nut motor assembly (best seen in FIG. 9) which allows for very fine control of lead screw position and consequently very fine control of the position of the control rod assembly. In the illustrated embodiment, the motor (e.g., stator 132, rotor 134) is a synchronous motor in which the rotor 134 is a permanent magnet. This design has advantages such as compactness and simplicity; however, other motor configurations are also contemplated.

The lead screw 160 does not scram. Instead, during a scram the top end of the lifting rod 112 of the lifting rod/connection rod assembly is disconnected from the lead screw 160 by the magnetically activated latching system (see FIG. 11). When power is cut to the electromagnets 177 the failsafe latching system releases the lifting/connection rod assembly (and thus the control rod assembly) from the lead screw 160 thereby initiating a scram. A bottom stop and buffering system (not illustrated, but suitably similar to the bottom stop and buffering system of the illustrative shutdown rods described herein with reference to FIGS. 4 and 5) is incorporated into the base/buffer assembly to dissipate the kinetic energy at the end of the scram stroke and to set the rod bottom elevation. A torque taker (not shown) is attached to the lead screw 160 to react the motor torque thereby providing translation of the lead screw/control rod assembly.

The normal state, that is, the state prior to scram, is shown in FIGS. 9 and 10. FIG. 9 illustrates the ball nut motor assembly and FIG. 10 shows the latching system engaged for normal operation. As seen in FIG. 10, the permanent magnets 178 on the latches 170 are magnetically attracted toward the powered electromagnets 177 thus pivoting the latches 170 about the pivot locations 180 and engaging the latches 170 with a mating region of the lifting rod 112. Thus, the latches 170 are secured with the lifting rod 112 in the normal state shown in FIG. 10. Further, the latching system base 179 is threaded to or otherwise secured with the lead screw 160. Accordingly, in the normal state of FIG. 10 the lifting rod 112 is secured with the lead screw 160 via the latching system, and so as the ball nut motor assembly shown in FIG. 9 translates the lead screw 160 the lifting rod 112 is translated with the lead screw 160.

Scram is described with reference to FIG. 11, which shows the lifting rod 112, and consequently the control rod assembly, during a scram. To initiate scram the power to the electromagnets 177 is cut, that is, turned off. This removes the attractive force on the permanent magnets 178 on the latches 170, and the latch spring 174 extends to pivot the latches 170 about the pivot locations 180 and away from the mating region of the lifting rod 112. This disengages the latches 170 from the lifting rod 112, and the lifting/connection rod assembly (and thus the control rod assembly) falls toward the reactor 12. The lead screw 160 is seen in FIG. 11 still at the previous withdrawal height (that is, the lead screw 160 is not scrammed), but power to the electromagnet coils 177 has been cut so that the magnetic field from the coils is removed.

Figure 11:
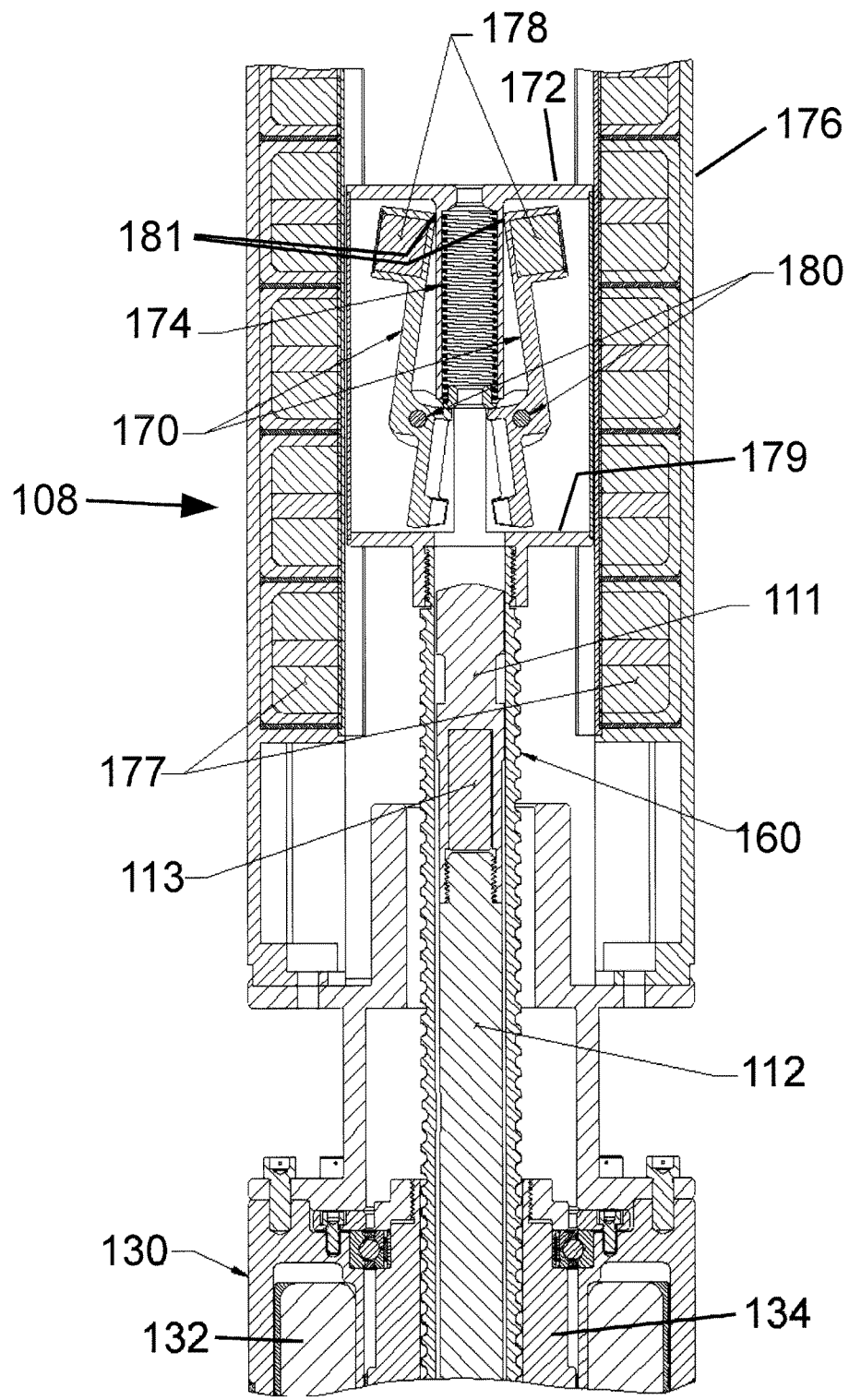

As further shown in FIG. 11, the pivoting of the latches 170 about the pivot locations 180 is stopped by impingement at a location 181 with the spring guide of the latch housing 172.

Figure 12:
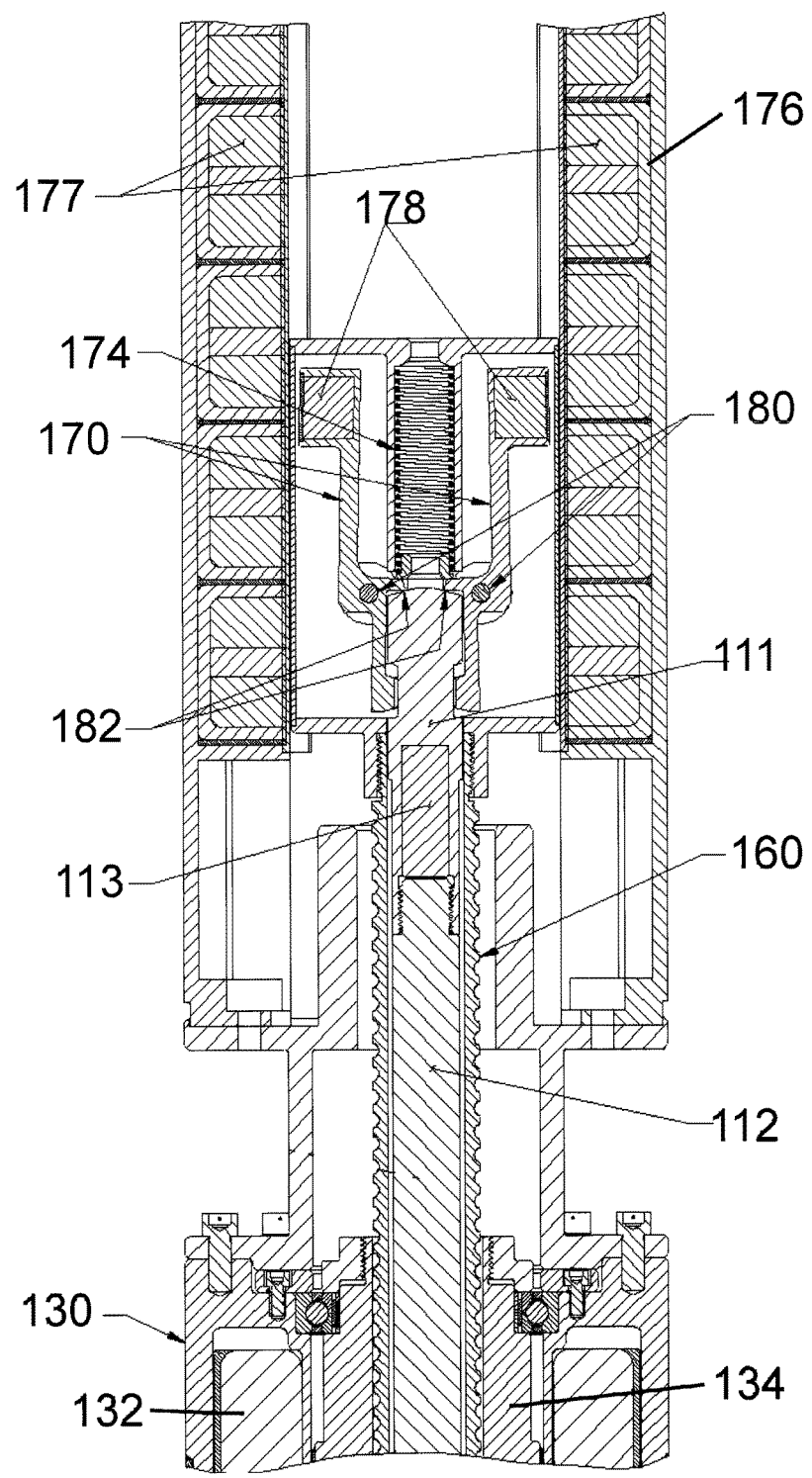
Figure 13:
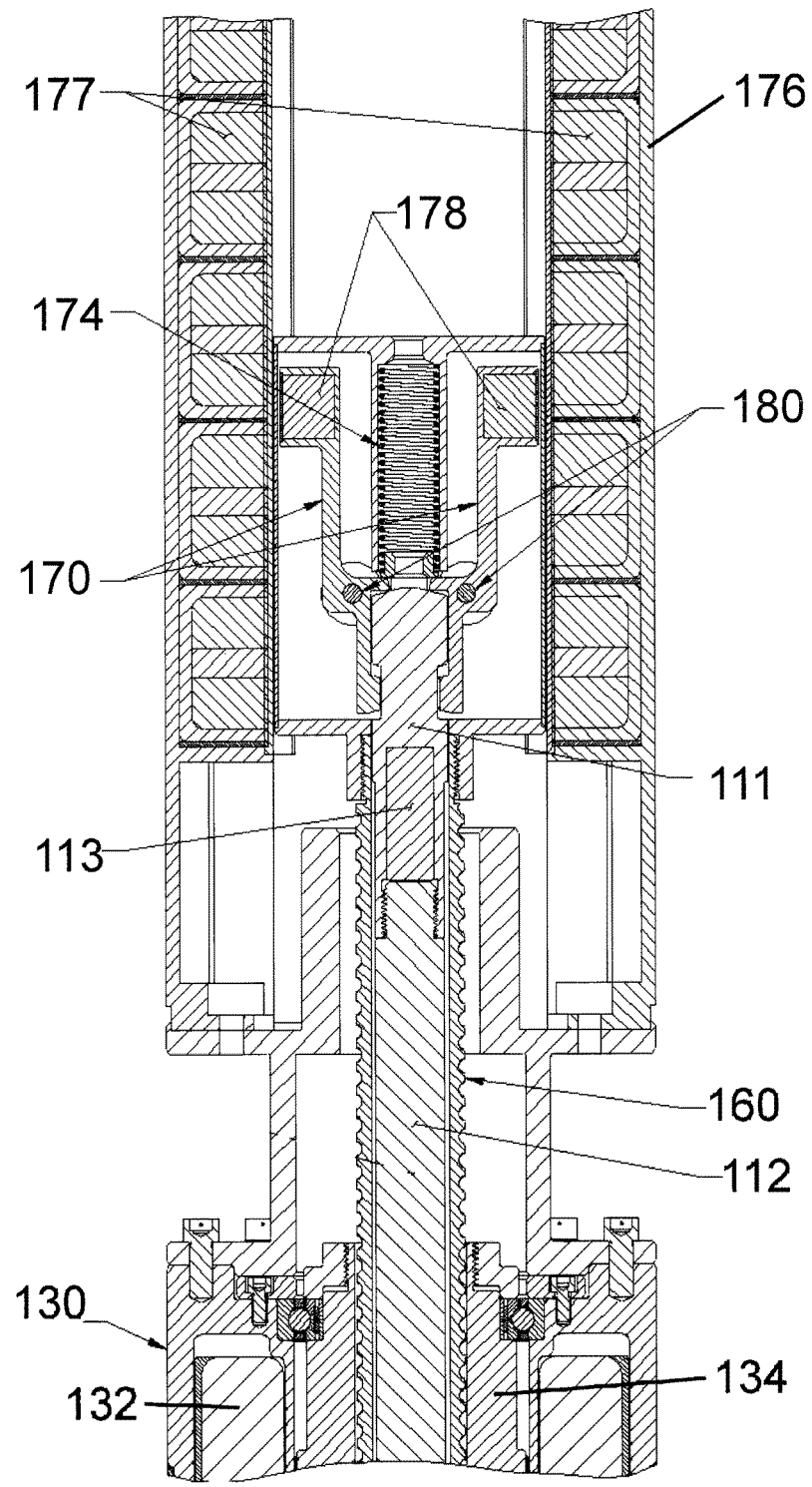

With continuing reference to FIG. 11 and further reference to FIGS. 12 and 13, to re-engage the mechanism after a scram, the lead screw 160 is driven to the fully inserted position via the ball nut motor (see again FIG. 9). A lead screw on-bottom sensor is used to confirm lead screw full insertion. With particular reference to FIG. 12, as the lead screw 160 nears the fully inserted position an angled camming surface 182 on the top 111 of the lifting rod 112, which is scrammed to the bottom, will cam the latches 170 to their near full out position. With particular reference to FIG. 13, when power is restored to the electromagnets 177, the latches 170 will fully re-engage with the mating region of the lifting rod 112 so that the lifting/connection rod assembly is once again connected to the lead screw 160. Normal operation can then resume as per FIG. 10. To reiterate, FIG. 12 shows the lead screw 160 being driven back down to the fully inserted position in preparation for re-engagement of the lifting rod 112. Power to the electromagnet coils 177 is still cut and the latches 160 are still disengaged. The angled camming surfaces 182 on the top 111 of the lifting rod 112 are camming the latches 170 back into partial engagement with the top 111 of the lifting rod 112. FIG. 13 shows the lead screw 160 still on bottom but with the power restored to the electromagnet coils 177. The restored magnet field has now re-engaged the latches 170 with the mating region of the lifting rod 112.

FIG. 9 diagrammatically shows a suitable embodiment of the ball nut/motor assembly 106, including lower and upper ball nut assemblies 150, 152. In general, substantially any type of motor can be used, suitably configured for operation in the pressure vessel environment.

Figure 14:
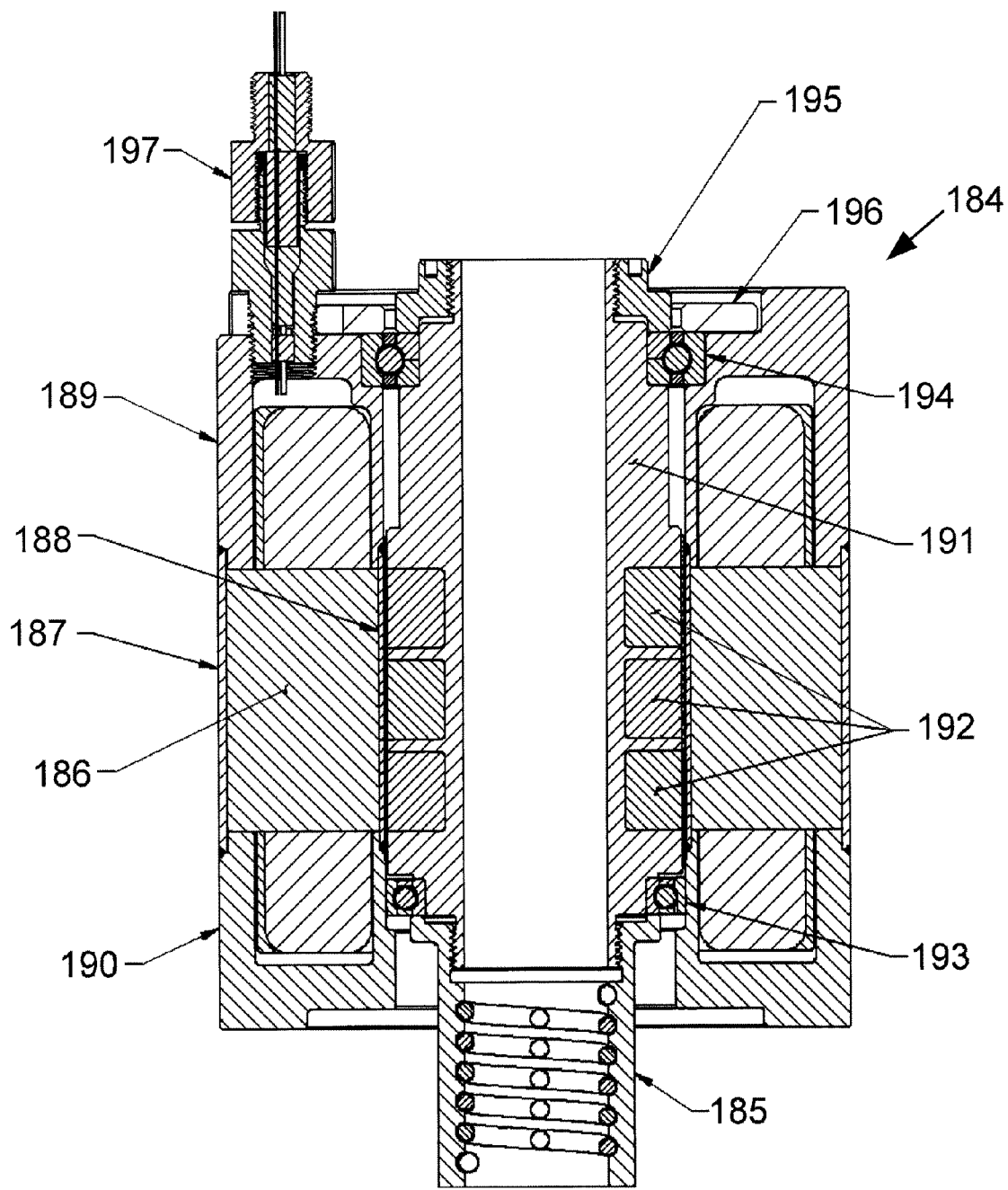
Figure 15:
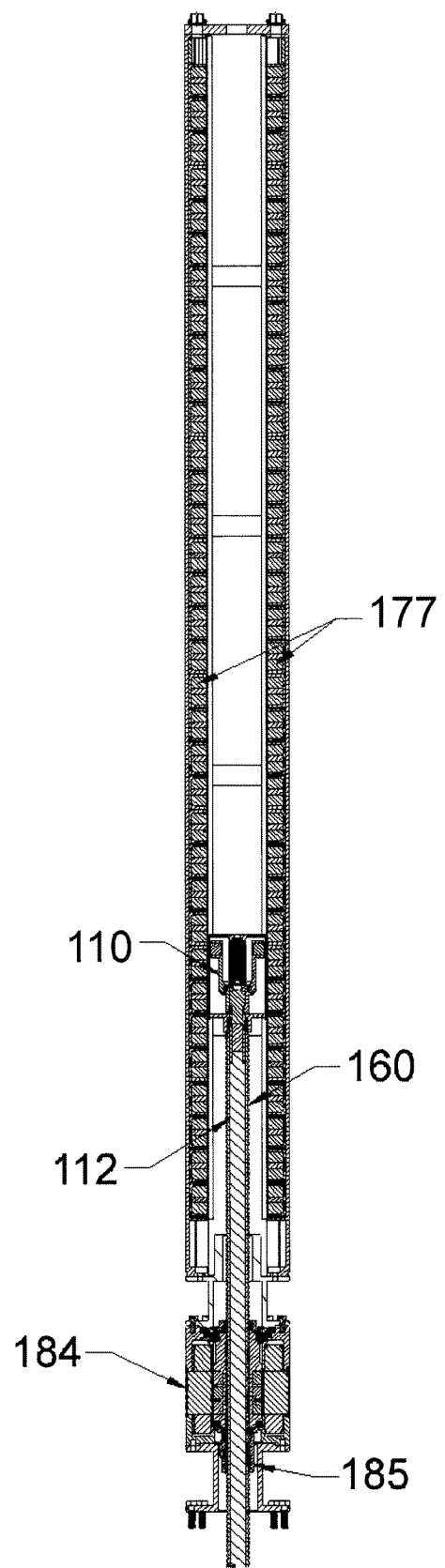

With reference to FIGS. 14 and 15, an illustrative embodiment is shown which employs a brushless DC electronically controlled (BLDC) motor 184 with lower ball nut assembly 185. The assembly 184, 185 is an illustrative embodiment of the ball nut/motor assembly 106. With particular reference to FIG. 14, the illustrative BLDC motor 184 includes a wound stator core assembly 186 disposed between a stator outer shell 187 and a stator inner shell 188 and secured by a stator upper housing 189 and stator lower housing 190. A permanent magnet rotor 191 includes permanent magnets 192. The BLDC motor 184 produces torque from interaction of magnetic flux of the rotor magnets 192 and the current carrying stator conductors of the stator core assembly 186. The lower ball nut assembly 185 is analogous to the lower ball-nut assembly 150 of FIG. 9; however, in the illustrative assembly of FIG. 14 there is no upper ball-nut assembly corresponding to the upper ball nut assembly 152 of FIG. 9. The assembly of FIG. 14 also includes a radial bearing 193, a thrust bearing 194 secured by a thrust bearing lock nut 195, and a motor top cap 196. An insulated and environmentally robust electrical connection to the motor is provided by a lead wire gland 197. For example, some suitable insulated lead wire glands are available from Conax® Technologies (Buffalo, N.Y., USA). With particular reference to FIG. 15, the BLDC motor 184 and lower ball-nut assembly 185 are illustrated in the context of the control rod drive mechanism (CRDM) of FIGS. 10-13. The illustrative CRDM of FIG. 15 also includes the previously described electromagnet coil stack assembly 177, lifting rod-to-lead screw latching assembly 110, lead screw 160, and lifting rod 112. The ball-nut assembly 185 engages the lead screw 160 so that, as the motor 184 rotates the permanent magnet rotor 191 and the secured ball-nut assembly 185, the lead screw 160 is driven linearly.

With returning reference to FIGS. 1 and 2, an advantage of the disclosed reactor design is that the middle section includes the internals support flange or "mid-flange" 29. This section can be made relatively thin, and provides support for the control rod drive mechanism and guides for the in-core instrumentation. This section provides electrical and hydraulic inputs for the control rod drive mechanisms (CRDMs). A reactor coolant drain penetration (not illustrated) is optionally also incorporated in this section. This drain line, if incorporated, is optionally isolated by an internal valve whenever the reactor is pressurized to limit or eliminate its potential as a loss of coolant accident (LOCA) site.

The illustrated upper internals 24 including the CRDM do not include illustrated thermal insulation. However, it is contemplated to insulate these components using an insulation system capable of withstanding a design temperature of at least about 650° F. (343° C.). By using the insulation system, external cooling water will not be required although may optionally also be used. For example, cooling water can be supplied to the electrical devices to reduce the severity of the heat duty imposed by the operating environment. The insulation system facilitates locating the electrical CRDM within the pressure vessel, which reduces the overall height of the reactor vessel 10, significantly reduces the number of penetrations into the reactor vessel 10, and enables a complete reactor module to be shipped as a single unit. Another advantage is reduction of the overall height of the containment structure (not shown). Although the use of insulation is believed to be advantageous, other contemplated solutions include the use of water cooling and/or selecting materials capable of withstanding the high operating temperature without insulation.

The illustrative reactor embodiment is an integral pressurized water reactor (PWR) configuration. However, one or more of the disclosed techniques, apparatuses, or so forth are also expected to be suitably used in other types of nuclear reactor vessels, such as boiling water reactors (BWRs) that can advantageously incorporate internal CRDM assemblies, efficient control rod position sensors, and so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A control rod mechanism for use in a nuclear reactor, the control rod mechanism comprising:
   a control rod configured for insertion in a reactor core to absorb neutrons;
   a lifting rod configured to support the weight of the control rod;
   a hollow lead screw through which the lifting rod passes;
   a drive mechanism including (i) a rotating nut engaged with the lead screw and (ii) a motor engaged with the nut to rotate the nut, the drive mechanism configured to operate by rotating the nut engaged with the lead screw to linearly translate the lead screw; and
   a latch mounted to the lead screw and configured to latch with the lifting rod wherein the latch and the latched lifting rod and the control rod translate together with the lead screw, the latch mounted to the lead screw further configured to open responsive to a loss or removal of electrical power to unlatch the lifting rod wherein the unlatched lifting rod and the control rod fall under the influence of gravity to scram the control rod when the latch is released;
   wherein the latch does not include the rotating nut of the drive mechanism.

2. The control rod mechanism as set forth in claim 1, wherein the control rod comprises a plurality of control rods and the lifting rod is configured to support the weight of the plurality of control rods by a spider assembly connecting the lifting rod with the plurality of control rods.

3. The control rod mechanism as set forth in claim 1, further comprising:
   an electromagnet configured to magnetically control the latch, wherein loss or removal of electrical power to the electromagnet causes the latch to open to unlatch the lifting rod.

4. The control rod mechanism as set forth in claim 3, wherein the electromagnet has a length greater than or equal to the length of a linear translation stroke over which the latch can be linearly translated by the drive mechanism.

5. The control rod mechanism as set forth in claim 3, wherein the latch includes permanent magnets that are attracted to the electromagnet when electrical power is supplied to the electromagnet.

6. The control rod mechanism as set forth in claim 3, wherein the latch is mechanically biased open and electrical power to the electromagnet operates to magnetically close the latch to latch with the lifting rod.

7. The control rod mechanism as set forth in claim 6, wherein the latch is mechanically biased open by a spring.

8. The control rod mechanism as set forth in claim 3, wherein the electromagnet is configured to not move with the lead screw when the drive mechanism operates to linearly translate the lead screw.

9. The control rod mechanism as set forth in claim 8, further comprising:
   an electromagnet housing that houses the electromagnet, the latch also being disposed inside the electromagnet housing.

10. the control rod mechanism of claim 1 wherein the lifting rod passes through the lead screw and the latch is mounted to an upper end of the lead screw and is configured to latch with an upper end of the lifting rod.

11. A nuclear reactor comprising:
    a reactor core;
    a pressure vessel including a lower vessel section containing the reactor core, an upper vessel section disposed above the reactor core and above the lower vessel section, and a mid-flange located above a reactor core and disposed between the lower vessel section and the upper vessel section; and
    a control rod mechanism as set forth in claim 1 disposed inside the pressure vessel and supported by the mid-flange.

12. The nuclear reactor as set forth in claim 11, further comprising:
    an integral steam generator disposed in the pressure vessel above the mid-flange.

13. The nuclear reactor as set forth in claim 11, further comprising:
    an internals basket assembly supporting the control rod mechanism and secured to the mid-flange.

14. The nuclear reactor as set forth in claim 11, further comprising:
    control rod guide frames supported by the mid-flange.

15. The nuclear reactor as set forth in claim 11, further comprising:
    a hydraulic shutdown control rod drive mechanism supported by the mid-flange.

16. The nuclear reactor as set forth in claim 11, wherein the mid-flange provides electrical and hydraulic inputs to the drive mechanism of the control rod mechanism.

17. A control rod drive mechanism (CRDM) for use in a nuclear reactor, the CRDM comprising:
    a drive motor including a rotor;
    a hollow lead screw through which the lifting rod passes and engaged with the drive motor, the lead screw configured to translate but not rotate in response to rotation of the rotor of the drive motor;
    a latch assembly mounted to the lead screw; and
    a lifting rod configured to support the weight of a control rod;
    wherein the latch assembly mounted to the lead screw is configured to have:
    (i) a latched state in which the lifting rod is latched to the lead screw by the latch assembly mounted to the lead screw, and
    (ii) an unlatched state in which the latch assembly mounted to the lead screw unlatches responsive to a loss of power initiating scram to unlatch the lifting rod from the lead screw.

18. the control rod mechanism of claim 17 wherein:
    the lifting rod passes through the lead screw and the latch assembly is mounted to an upper end of the lead screw, and
    in the latched state the upper end of the lifting rod is latched to the lead screw by the latch assembly mounted to the upper end of the lead screw.

19. A control rod mechanism for use in a nuclear reactor, the control rod mechanism comprising:
    a control rod configured for insertion in a reactor core to absorb neutrons;
    a lifting rod having a bottom end connected with the control rod;
    a hollow lead screw through which the lifting rod passes;
    a motor-driven nut configured such that rotating the nut causes linear translation of the hollow lead screw; and
    a latch mounted on a top end of the hollow lead screw, a top end of the lifting rod being latched by the latch to the top end of the hollow lead screw to move together with the hollow lead screw in response to rotating the nut, the latch configured to open in response to a loss or removal of electrical power to unlatch the top end of the lifting rod from the top end of the hollow lead screw.

20. The control rod mechanism as set forth in claim 19, wherein the control rod comprises a plurality of control rods connected with the bottom end of the lifting rod via a spider assembly.

21. The control rod mechanism as set forth in claim 19, further comprising:
- an electromagnet magnetically controlling the latch, wherein loss or removal of electrical power to the electromagnet causes the latch to open to unlatch the top end of the lifting rod from the top end of the hollow lead screw.

\* \* \* \* \*